United States Patent
Merritt et al.

(10) Patent No.: US 7,807,300 B2
(45) Date of Patent: Oct. 5, 2010

(54) RESISTANCE-STABILIZING ADDITIVES FOR ELECTROLYTE

(75) Inventors: Donald R. Merritt, Brooklyn Center, MN (US); Craig L. Schmidt, Eagan, MN (US)

(73) Assignee: Medtronic, Inc., Minneapolis, MN (US)

( * ) Notice: Subject to any disclaimer, the term of this patent is extended or adjusted under 35 U.S.C. 154(b) by 1119 days.

(21) Appl. No.: 11/344,376

(22) Filed: Jan. 31, 2006

(65) Prior Publication Data

US 2007/0178378 A1   Aug. 2, 2007

(51) Int. Cl.
*H01M 6/16* (2006.01)
(52) U.S. Cl. ............... 429/324; 429/326; 429/339
(58) Field of Classification Search ............... None
See application file for complete search history.

(56) References Cited

U.S. PATENT DOCUMENTS

| | | | |
|---|---|---|---|
| 3,423,242 A | 1/1969 | Meyers | |
| 4,310,609 A | 1/1982 | Liang et al. | |
| 4,391,729 A | 7/1983 | Liang et al. | |
| 4,398,346 A | 8/1983 | Underhill et al. | |
| 4,447,346 A | 5/1984 | MacNamee et al. | |
| 4,469,610 A | 9/1984 | Fukuda et al. | |
| 4,715,976 A | 12/1987 | Mori et al. | |
| 4,860,169 A | 8/1989 | Dapo | |
| 4,894,302 A | 1/1990 | Hoffman et al. | |
| 4,957,833 A | 9/1990 | Daifuku et al. | |
| 4,964,877 A | 10/1990 | Keister et al. | |
| 4,975,806 A | 12/1990 | Clouse | |
| 5,017,444 A | 5/1991 | Nakajima et al. | |
| 5,144,949 A | 9/1992 | Olson | |
| 5,147,737 A | 9/1992 | Post et al. | |
| 5,154,992 A | 10/1992 | Berberick et al. | |
| 5,158,078 A | 10/1992 | Bennett et al. | |
| 5,175,066 A | 12/1992 | Hamwi et al. | |
| 5,175,674 A | 12/1992 | Dapo | |
| 5,180,642 A | 1/1993 | Weiss et al. | |
| 5,221,453 A | 6/1993 | Crespi | |
| 5,250,373 A | 10/1993 | Muffoletto et al. | |
| 5,260,145 A | 11/1993 | Armand et al. | |
| 5,273,840 A * | 12/1993 | Dominey | 429/307 |
| 5,306,581 A | 4/1994 | Taylor et al. | |
| 5,312,453 A | 5/1994 | Shelton et al. | |

(Continued)

FOREIGN PATENT DOCUMENTS

EP    0 885 874 A1    5/1998

(Continued)

OTHER PUBLICATIONS

Kominato et al., "Analysis of surface films on lithium in various organic electrolytes," *Journal of Power Sources*, Oct. 1997, 68(2): 471-475.

(Continued)

*Primary Examiner*—Keith Walker
(74) *Attorney, Agent, or Firm*—Carol F. Barry

(57) ABSTRACT

A resistance-stabilizing additive to an electrolyte for a battery cell in an implantable medical device is presented. At least one resistance-stabilizing additive is selected from a group comprising an electron withdrawing group, an aromatic diacid salt, an inorganic salt, an aliphatic organic acid, an aromatic diacid, and an aromatic monoacid.

23 Claims, 7 Drawing Sheets

U.S. PATENT DOCUMENTS

| | | | |
|---|---|---|---|
| 5,312,458 | A | 5/1994 | Muffoletto et al. |
| 5,342,409 | A | 8/1994 | Mullett |
| 5,434,017 | A | 7/1995 | Berkowitz et al. |
| 5,437,692 | A | 8/1995 | Dasgupta et al. |
| 5,439,760 | A | 8/1995 | Howard et al. |
| 5,468,569 | A | 11/1995 | Pyszczek et al. |
| 5,472,810 | A | 12/1995 | Takeuchi et al. |
| 5,496,481 | A | 3/1996 | Liu |
| 5,498,494 | A | 3/1996 | Takeuchi et al. |
| 5,507,966 | A | 4/1996 | Liu |
| 5,549,717 | A | 8/1996 | Takeuchi et al. |
| 5,550,706 | A | 8/1996 | Kurzweil et al. |
| 5,558,680 | A | 9/1996 | Takeuchi et al. |
| 5,677,086 | A | 10/1997 | Satoh et al. |
| 5,695,892 | A | 12/1997 | Leising et al. |
| 5,716,729 | A | 2/1998 | Sunderland et al. |
| 5,744,258 | A | 4/1998 | Bai et al. |
| 5,753,389 | A | 5/1998 | Gan et al. |
| 5,766,797 | A | 6/1998 | Crespi et al. |
| 5,776,635 | A | 7/1998 | Gan et al. |
| 5,895,733 | A | 4/1999 | Crespi et al. |
| 5,955,218 | A | 9/1999 | Crespi et al. |
| 5,962,720 | A | 10/1999 | Gan et al. |
| 5,989,748 | A | 11/1999 | Nagasubramanian |
| 6,006,133 | A | 12/1999 | Lessar et al. |
| 6,017,656 | A | 1/2000 | Crespi et al. |
| 6,030,720 | A | 2/2000 | Chu et al. |
| 6,057,062 | A | 5/2000 | Gan et al. |
| 6,093,506 | A | 7/2000 | Crespi et al. |
| 6,130,005 | A | 10/2000 | Crespi et al. |
| 6,136,477 | A | 10/2000 | Gan et al. |
| 6,150,057 | A | 11/2000 | Takeuchi |
| 6,153,338 | A | 11/2000 | Gan et al. |
| 6,174,629 | B1 | 1/2001 | Gan et al. |
| 6,180,283 | B1 | 1/2001 | Gan et al. |
| 6,200,701 | B1 | 3/2001 | Gan et al. |
| 6,203,942 | B1 | 3/2001 | Gan et al. |
| 6,210,839 | B1 | 4/2001 | Gan et al. |
| 6,221,534 | B1 | 4/2001 | Takeuchi et al. |
| 6,265,106 | B1 | 7/2001 | Gan et al. |
| 6,274,269 | B1 | 8/2001 | Gan et al. |
| 6,350,542 | B1 | 2/2002 | Gan et al. |
| 6,350,546 | B1 | 2/2002 | Gan et al. |
| 6,403,256 | B1 | 6/2002 | Gan et al. |
| 6,444,360 | B2 | 9/2002 | Gan et al. |
| 6,451,483 | B1 | 9/2002 | Probst et al. |
| 6,495,285 | B2 | 12/2002 | Gan et al. |
| 6,522,524 | B1 | 2/2003 | Feger et al. |
| 6,551,747 | B1 | 4/2003 | Gan |
| 6,562,255 | B1 | 5/2003 | Feger |
| 6,587,329 | B1 | 7/2003 | Feger |
| 6,630,272 | B1 | 10/2003 | Iwamoto et al. |
| 6,743,370 | B1 | 6/2004 | Feger et al. |
| 6,744,619 | B1 | 6/2004 | Feger |
| 6,783,888 | B2 | 8/2004 | Gan et al. |
| 6,942,819 | B2 | 9/2005 | Ebel et al. |
| 7,225,035 | B2 | 5/2007 | Brabec et al. |
| 2002/0012844 | A1 | 1/2002 | Gan et al. |
| 2002/0192562 | A1 | 12/2002 | Ferreira et al. |
| 2003/0190531 | A1 | 10/2003 | Otsuki et al. |
| 2004/0012370 | A1 | 1/2004 | Miller |
| 2004/0029005 | A1 | 2/2004 | Leising et al. |
| 2004/0161671 | A1 | 8/2004 | Merritt et al. |
| 2005/0117276 | A1 | 6/2005 | Liu et al. |
| 2005/0180094 | A1 | 8/2005 | Muffoletto et al. |
| 2006/0099495 | A1 | 5/2006 | Suzuki et al. |
| 2006/0166078 | A1 | 7/2006 | Chen et al. |
| 2007/0077488 | A1 | 4/2007 | Chen et al. |
| 2007/0176151 | A1 | 8/2007 | Chen et al. |
| 2007/0178371 | A1 | 8/2007 | Merritt et al. |
| 2007/0178378 | A1 | 8/2007 | Merritt et al. |
| 2007/0178381 | A1 | 8/2007 | Howard et al. |
| 2007/0275284 | A1 | 11/2007 | Merritt et al. |
| 2009/0181302 | A1 | 7/2009 | Chen et al. |

FOREIGN PATENT DOCUMENTS

| | | |
|---|---|---|
| EP | 0 885 874 B1 | 5/1998 |
| EP | 0 918 364 A1 | 10/1998 |
| EP | 0 918 364 B1 | 10/1998 |
| EP | 1 109 244 A2 | 6/2001 |
| EP | 1 156 541 A2 | 11/2001 |
| EP | 1 176 659 A2 | 1/2002 |
| EP | 1193781 A2 | 4/2002 |
| EP | 1 207 568 A2 | 5/2002 |
| EP | 1 156 541 A3 | 3/2003 |
| EP | 1 313 159 A2 | 5/2003 |
| EP | 1 331 683 A2 | 7/2003 |
| EP | 1 313 159 A3 | 4/2004 |
| EP | 1 207 568 A3 | 8/2005 |
| EP | 1 331 683 A3 | 8/2005 |
| JP | 2-154411 | 6/1990 |
| JP | 2-156620 | 6/1990 |
| JP | 02156620 A | 6/1990 |
| JP | 4-304612 | 10/1992 |
| JP | 04304612 A | 10/1992 |
| JP | 8-335533 | 12/1996 |
| JP | 08335533 A | 12/1996 |
| JP | 2001/176548 | 6/2001 |
| JP | 2002/170569 | 6/2002 |
| JP | 02154411 A | 8/2007 |
| WO | WO 00/36683 A2 | 6/2000 |
| WO | WO 00/36683 A3 | 6/2000 |
| WO | WO 03/021707 | 3/2003 |
| WO | WO2004075332 A | 9/2004 |

OTHER PUBLICATIONS

U.S. Appl. No. 12/683,514, filed Jan. 7, 2010, Merritt et al.

Norton et al., "Resistance Modeling of Lithium-Silver Vanadium Oxide Batteries," *Proceedings of the Symposium on Batteries for Portable Applications and Electric Vehicles*, vol. 97-18, Pennington, NJ, 1997, 389-397.

Schmidt et al., "Mass transport limitation in implantable defibrillator batteries," *Journal of Power Sources*, 2003, 119-121: 979-985.

* cited by examiner

RESISTANCE-STABILIZING ADDITIVES FOR ELECTROLYTE

RELATED APPLICATION

Attention is directed to U.S. patent application Ser. No. 10/366,214 filed Feb. 13, 2003 entitled "Liquid Electrolyte For An Electrochemical Cell," published as U.S. Pat. Appl. Pub. No. 2004/0161671 on Aug. 19, 2004, which is incorporated herein by reference in its entirety.

FIELD OF THE INVENTION

The present invention generally relates to an electrochemical cell and, more particularly, to an additive in an electrolyte for a battery.

BACKGROUND OF THE INVENTION

Implantable medical devices (IMDs) detect and treat a variety of medical conditions in patients. IMDs include implantable pulse generators (IPGs) or implantable cardioverter-defibrillators (ICDs) that deliver electrical stimuli to tissue of a patient. ICDs typically comprise, inter alia, a control module, a capacitor, and a battery that are housed in a hermetically sealed container. When therapy is required by a patient, the control module signals the battery to charge the capacitor, which in turn discharges electrical stimuli to tissue of a patient.

The battery includes a case, a liner, and an electrode assembly. The liner surrounds the electrode assembly to prevent the electrode assembly from contacting the inside of the case. The electrode assembly comprises an anode and a cathode with a separator therebetween. In the case wall or cover is a fill port or tube that allows introduction of electrolyte into the case. The electrolyte is a medium that facilitates ionic transport and forms a conductive pathway between the anode and cathode. An electrochemical reaction between the electrodes and the electrolyte causes charge to be stored on each electrode. The electrochemical reaction also creates a solid electrolyte interphase (SEI) or passivation film on a surface of an anode such as a lithium anode. The passivation film is ionically conductive and prevents parasitic loss of lithium. However, the passivation film increases internal resistance which reduces the power capability of the battery. It is desirable to reduce internal resistance associated with the passivation film for a battery.

BRIEF DESCRIPTION OF THE DRAWINGS

The present invention will become more fully understood from the detailed description and the accompanying drawings, wherein.

DETAILED DESCRIPTION

Figure 1:
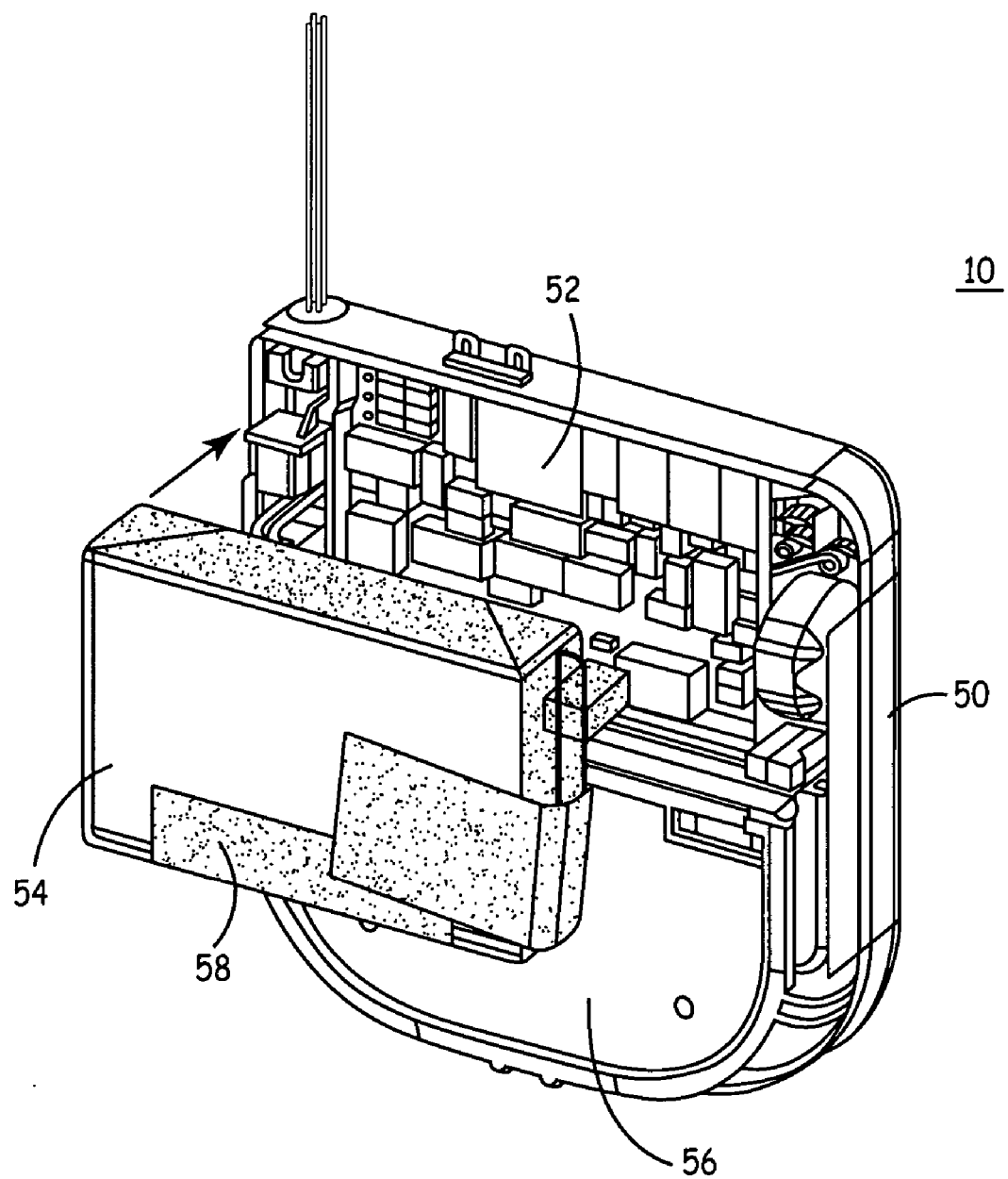
FIG. 1 is a cutaway perspective view of an implantable medical device (IMD)

The following description of embodiments is merely exemplary in nature and is in no way intended to limit the invention, its application, or uses. For purposes of clarity, the same reference numbers are used in the drawings to identify similar elements.

The present invention is directed to an additive for an electrolyte. The additive stabilizes resistance of the battery during storage, thermal processing, and throughout discharge. A resistance-stabilizing additive is defined as one or more chemical compounds, added to an electrolyte, that causes a battery to exhibit low resistance (i.e. generally below 500 ohm centimeter $(cm)^2$) throughout the battery's useful life. In one embodiment, the additive is characterized by an electron withdrawing group. Exemplary chemical compounds containing electron withdrawing group include 2,2, 2,-trifluoroacetamide, and benzoyl acetone. In another embodiment, an organic acid serves as a resistance-stabilizing additive. Exemplary organic acids include benzoic acids, carboxylic acids, malic acid, tetramethylammonium (TMA) hydrogen phthalate and hexafluoroglutaric acid.

A battery that includes an exemplary additive may be autoclaved at 125° C. for a half an hour, defined as one cycle, performed three times without adversely affecting the battery. The additives may be used in low, medium, or high capacity batteries.

FIG. 1 depicts an implantable medical device (IMD) 10. IMD 10 includes a case 50, a control module 52, a battery 54 (e.g. organic electrolyte battery) and capacitor(s) 56. Control module 52 controls one or more sensing and/or stimulation processes from IMD 10 via leads (not shown). Battery 54 includes an insulator 58 disposed therearound. Battery 54 charges capacitor(s) 56 and powers control module 52.

Figures 2, 3:
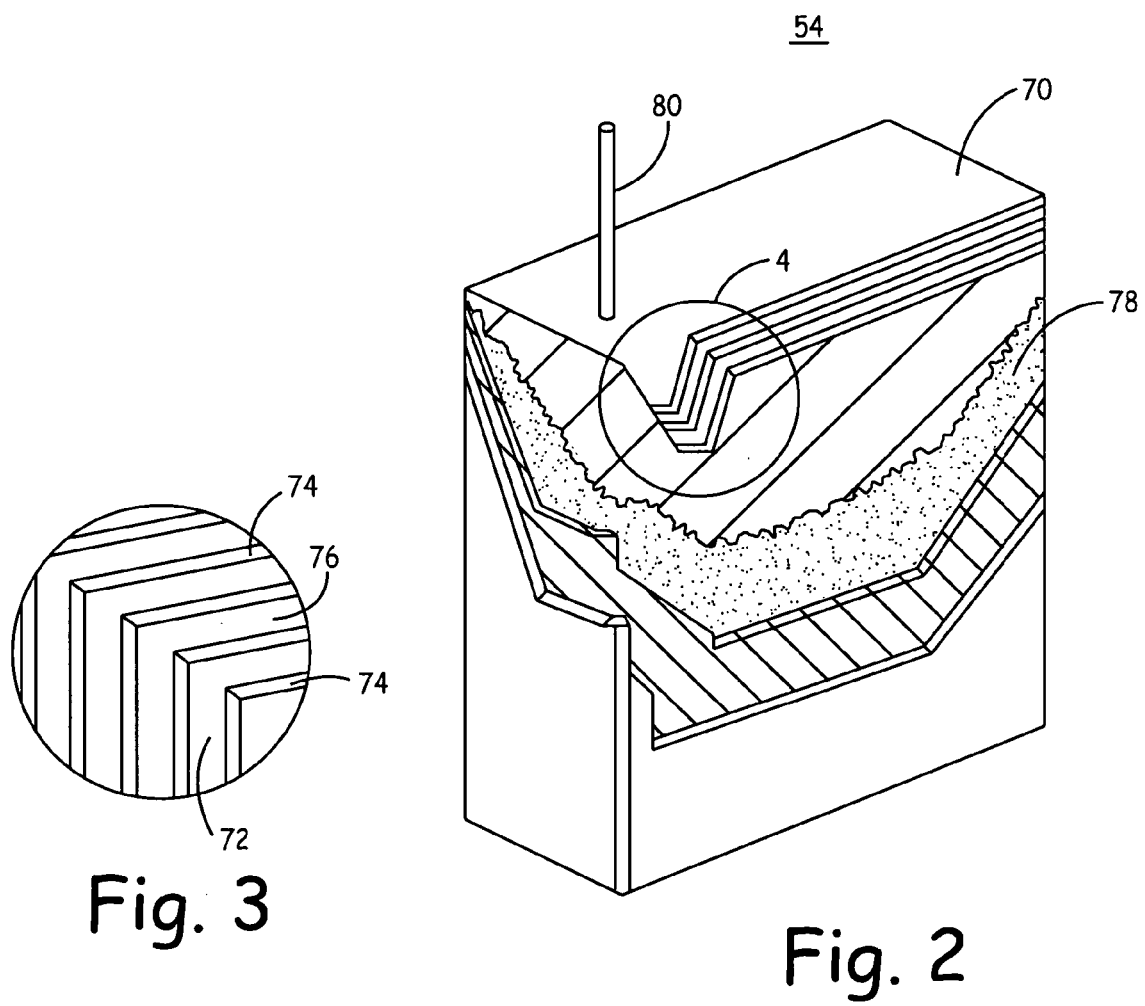
FIG. 2 is a cutaway perspective view of a battery in the IMD of FIG. 1.
FIG. 3 is an enlarged view of a portion of the battery depicted in FIG. 2 and designated by line 4.

FIGS. 2 and 3 depict details of an exemplary organic electrolyte battery 54. Battery 54 includes a case 70, an anode 72, separators 74, a cathode 76, a liquid electrolyte 78, and a feed-through terminal 80. Cathode 76 is wound in a plurality of turns, with anode 72 interposed between the turns of the cathode winding. Separator 74 insulates anode 72 from cathode 76 windings. Case 70 contains the liquid electrolyte 78 to create a conductive path between anode 72 and cathode 76. Electrolyte 78, which includes an additive, serves as a medium for migration of ions between anode 72 and cathode 76 during an electrochemical reaction with these electrodes.

Anode 72 is formed of a material selected from Group IA, IIA or IIIB of the periodic table of elements (e.g. lithium, sodium, potassium, etc.), alloys thereof or intermetallic compounds (e.g. Li—Si, Li—B, Li—Si—B etc.). Anode 72 comprises an alkali metal (e.g. lithium, etc.) in metallic or ionic form.

Cathode 76 may comprise metal oxides (e.g. vanadium oxide, silver vanadium oxide (SVO), manganese dioxide ($MnO_2$) etc.), carbon monofluoride and hybrids thereof (e.g., $CF_x+MnO_2$), combination silver vanadium oxide (CSVO) or other suitable compounds.

Figure 4:
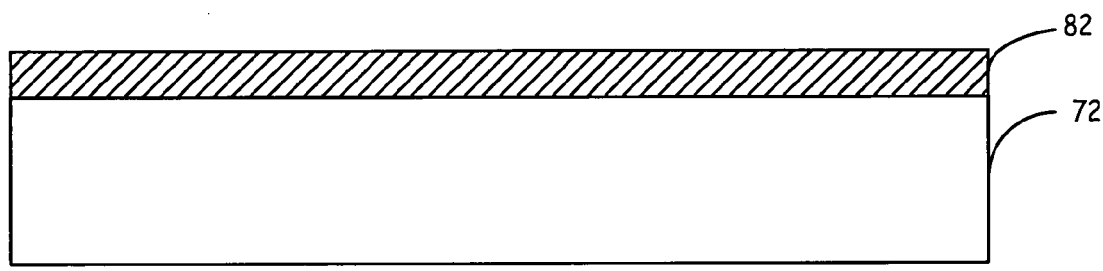
FIG. 4 is a cross-sectional view of an anode and a passivation film.

Electrolyte 78 chemically reacts with anode 72 to form an ionically conductive passivation film 82 on anode 72, as shown in FIG. 4. Electrolyte 78 includes a base liquid electrolyte composition and at least one resistance-stabilizing additive selected from Table 1 presented below. The base electrolyte composition typically comprises 1.0 molar (M) lithium tetrafluoroborate (1-20% by weight), gamma-butyrolactone (50-70% by weight), and 1,2-dimethoxyethane (30-50% by weight). In one embodiment, resistance-stabilizing additives are directed to chemical compounds that include electron withdrawing groups. An exemplary chemical compound with an electron withdrawing group includes 2,2,2-trifluoroacetamide. In another embodiment, the additive is a proton donor such as an organic acid. One type of organic acid is benzoic acid (e.g. 3-hydroxy benzoic acid or 2-4 hydroxy benzoic acid etc.). Every combination of benzoic acid and hydroxyl benzoic acids that exists may be used as a resistance-stabilizing additive composition. Malic acid and tetramethylammonium hydrogen phthalate are other organic acids that may serve as a resistance-stabilizing additive.

Tables 1 and 2 list some exemplary resistance-stabilizing additives. In particular, Table 1 ranks each additive as to its effectiveness with a rank of 1 being the highest or best additive and rank 6 being the lowest ranked additive. Table 1 also briefly describes the time period in which battery 54, which included the specified additive in the electrolyte 78, exhibited resistance-stabilizing characteristics.

TABLE 1

List of exemplary additive resistance-stabilizing additives

| Rank | Chemical class | Exemplary additive compound | Chemical Structure | Notes |
|---|---|---|---|---|
| 3 | Aromatic diacid salts | Tetramethyl-ammonium (TMA) hydrogen phthalate | (phthalate with OH, O⁻, N(CH₃)₄⁺) | Battery exhibited excellent resistance-stabilizing characteristic during storage. Battery exhibited good to neutral resistance-stabilizing characteristic during discharge |
| 6 | Inorganic acid salts | Tetrabutyl-ammonium (TBA) hydrogen sulfate | $(CH_3CH_2CH_2CH_2)_4N^+$ , $HSO_4^-$ | Battery exhibited good resistance-stabilizing characteristic during storage. Battery exhibited neutral resistance-stabilizing characteristic during discharge |
| 5 | Aliphatic organic acids | Phosphonoacetic acid | $HO-P(=O)(OH)-CH_2-C(=O)OH$ | Battery exhibited excellent resistance-stabilizing characteristic during storage. Battery exhibited good to neutral resistance-stabilizing characteristic during discharge |
| 1 | (*) | 2,2,2-Trifluoroacetamide | $F_3C-C(=O)-NH_2$ | Battery exhibited excellent resistance-stabilizing characteristic during storage and discharge |
| | (*) | Trifluoromethyl vinyl acetate | $H_3CO-C(=O)-C(CF_3)=CH_2$ | Battery exhibited very good resistance-stabilizing characteristic during discharge |

TABLE 1-continued

List of exemplary additive resistance-stabilizing additives

| Rank | Chemical class | Exemplary additive compound | Chemical Structure | Notes |
|---|---|---|---|---|
| 4 | Aromatic diacids | Phthalic acid | 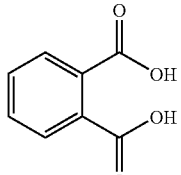 | Battery exhibited good resistance-stabilizing characteristic during storage and discharge |
| (*) | | Benzoylacetone | 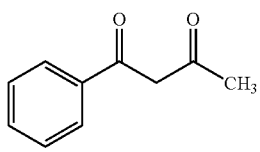 | Battery exhibited good resistance-stabilizing characteristic during storage and discharge |
| (*) | | Benzoyltrifluoro-acetone | 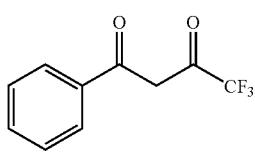 | Battery exhibited good resistance-stabilizing characteristic during storage and discharge |
| 2 | Aromatic mono-acids | Benzoic acid | 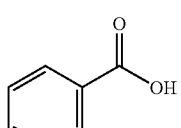 | Battery exhibited excellent resistance-stabilizing characteristic during storage and discharge |

(*) These compounds include a chemical structure that is characterized by one or more electron-withdrawing groups (e.g. —$CF_3$, —$C_6H_5$ located one or two carbon atoms from a double-bonded oxygen atom (i.e. a ketone group)). Additionally, the listed additives may be added to the base electrolyte composition in the range of about 0.001 M to 0.5 M.

Table 2 lists exemplary additive compositions that are mixed with the base electrolyte composition to produce effective resistance-stabilization in battery 54. Effective additive compositions are based upon additives that exhibit superior resistance-stabilizing characteristics either at the beginning of life (BOL) or at the end of life (EOL) of battery 54. In one embodiment, an additive composition comprises a first additive that exhibits substantially superior resistance-stabilizing characteristics at the BOL whereas a second additive exhibits substantially superior resistance-stabilizing characteristics at the EOL. In another embodiment, a first resistance-stabilizing additive exhibits a substantially superior resistance-stabilizing characteristics at the BOL whereas a second resistance-stabilizing additive exhibits average resistance-stabilizing characteristics at the EOL. In still yet another embodiment, a first resistance-stabilizing additive exhibits substantially superior resistance-stabilizing characteristics at the EOL whereas a second resistance-stabilizing additive exhibits average resistance-stabilizing characteristics at the BOL. Generally, each additive is combined with the electrolyte 78 through dissolution or other suitable means.

TABLE 2

Exemplary resistance-stabilizing composition additives

| Additive compositions | Quantity of each additive |
|---|---|
| TMA hydrogen phthalate + 2,2,2-Trifluoroacetamide | About 0.001 M to about 0.5M |
| TMA hydrogen phthalate + Trifluoromethyl vinyl acetate | About 0.001 M to about 0.5M |
| TMA hydrogen phthalate + Acetone | About 0.001 M to about 0.5M |
| TMA hydrogen phthalate + Xylitol | About 0.001 M to about 0.05M |
| Phosphonoacetic acid + 2,2,2-Trifluoroacetamide | About 0.001 M to about 0.5M |
| Phosphonoacetic acid + Trifluoromethyl vinyl acetate | About 0.001 M to about 0.5M |
| Phosphonoacetic acid + Acetone | About 0.001 M to about 0.5M |
| Phosphonoacetic acid + Xylitol | About 0.001 M to about 0.5M |

Figure 5:
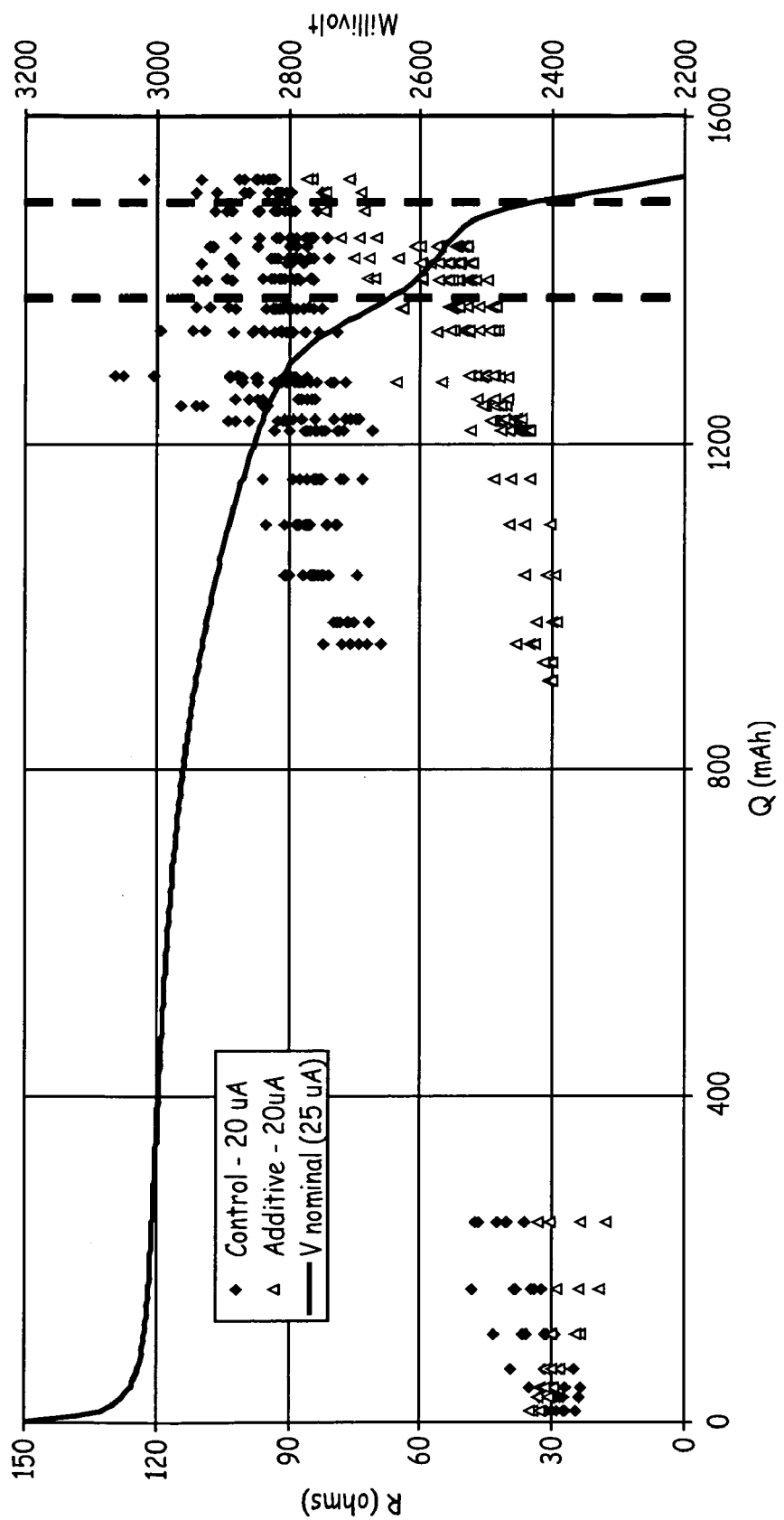
FIG. 5 is graph that compares discharge and resistance for a conventional and exemplary additive in an electrolyte.
Figure 6:
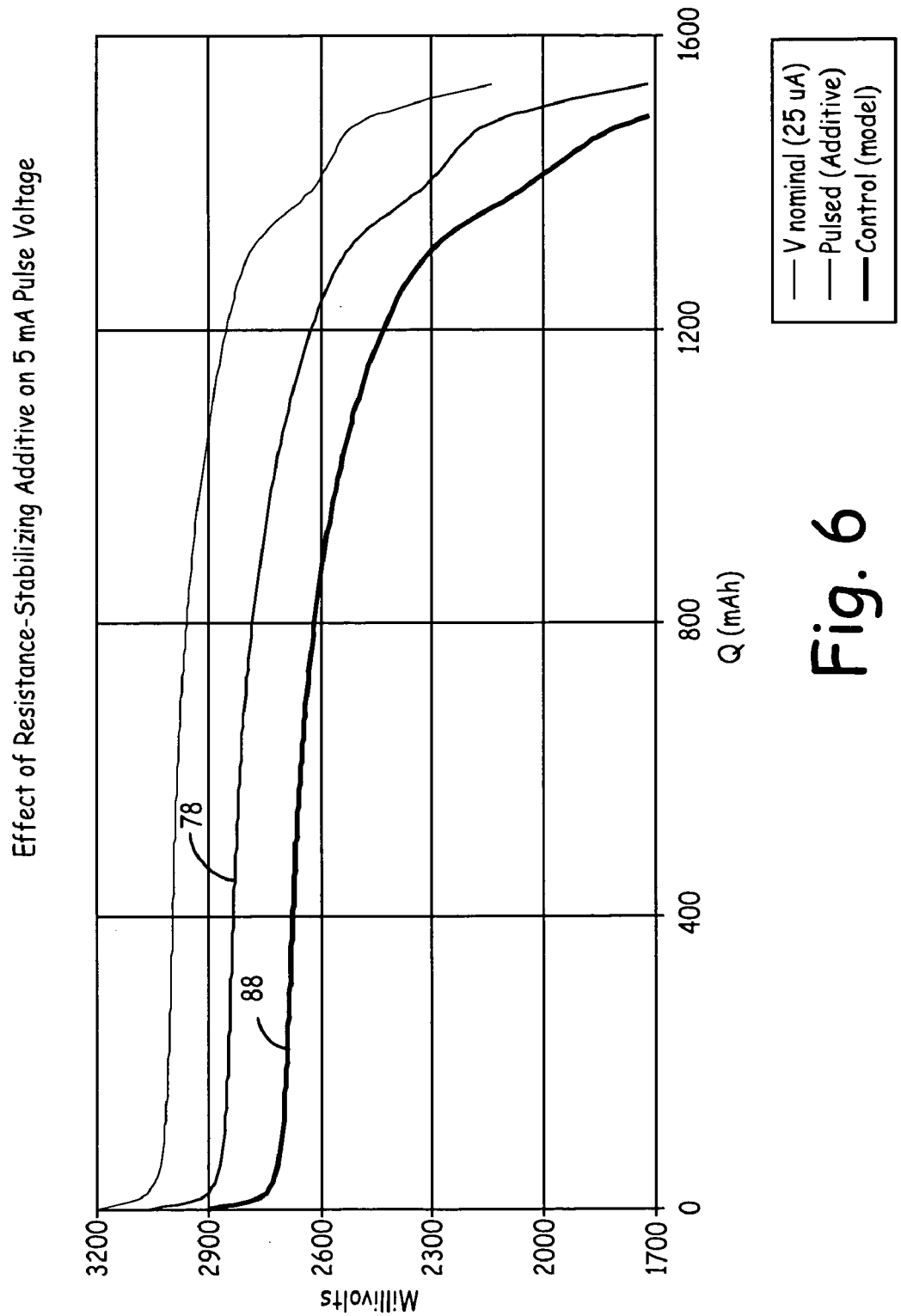
FIG. 6 is graph that compares resistance over time for exemplary additives to an electrolyte.

FIGS. 5-6 graphically depict the resistance-stabilizing superiority of electrolyte 78 over a control electrolyte 88. Electrolyte 78 includes 2,2,2-trifluoroacetamide as the resistance-stabilizing additive and the base electrolyte composition previously described. Control electrolyte 88 is the base electrolyte composition without any additive. Passivation layer 82 initially possesses similar discharge to passivation layer formed by control electrolyte 88. However, later in the discharge (e.g. about 0.90 ampere·hour(Ah)), the passivation layer formed by control electrolyte 88 exhibits resistance that substantially increases. In contrast, electrolyte 78 that includes the additive causes battery 54 to exhibit resistance that remains substantially below the resistance of control electrolyte 88 late in discharge. For example, electrolyte 78 results in battery 54 having 30 ohms lower resistance than control electrolyte 88, as show in FIG. 5.

If the resistance increases in the area between 1 and 1.2 Ah of the curve and IMD 10 records the voltage after a high current event (e.g. telemetry event etc.), a recommended replacement time (RRT) signal may be generated. Preferably, desirable resistance is kept low as long as possible to increase efficiency of battery 54.

Figure 7:
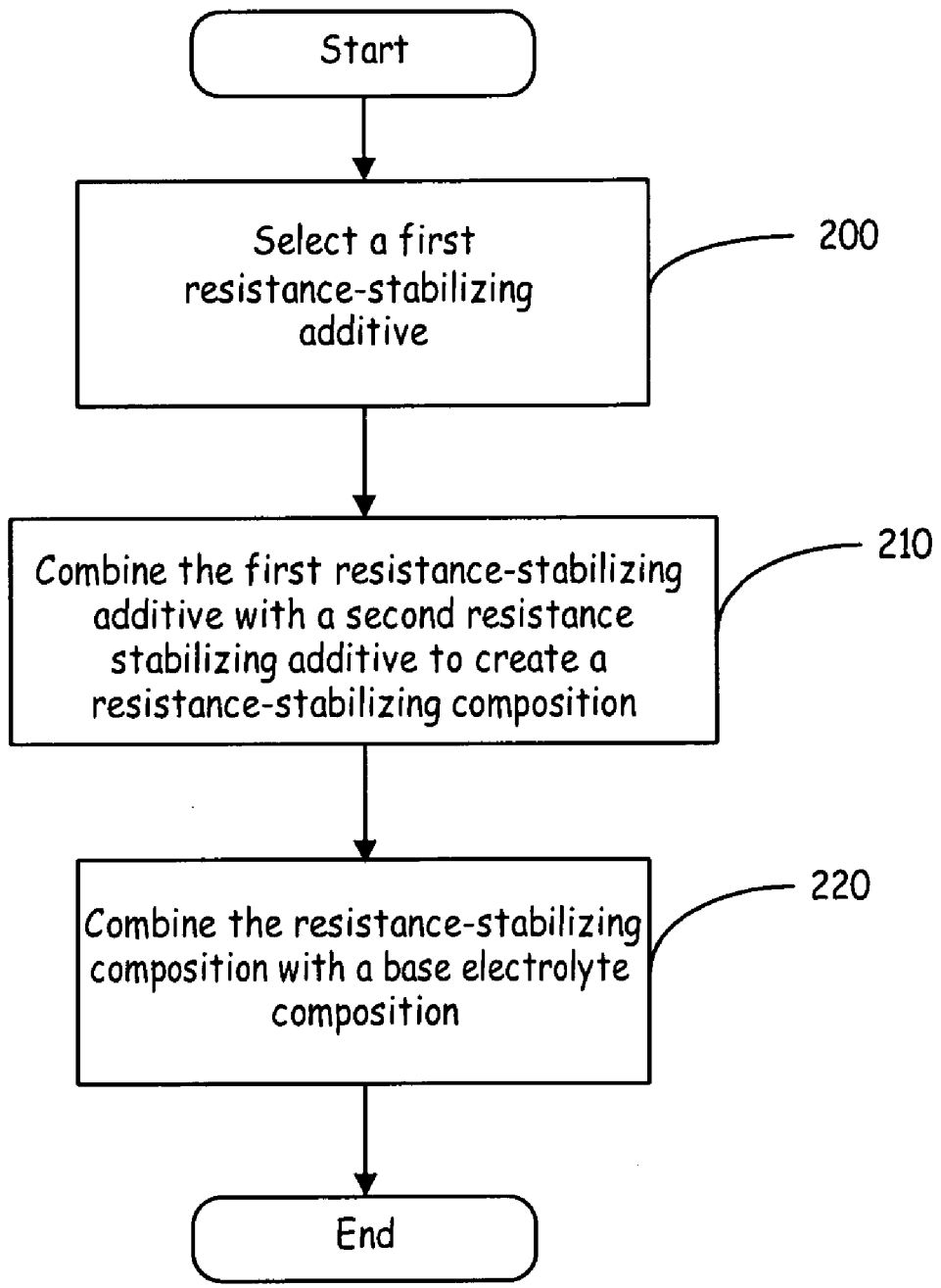
FIG. 7 is a flow diagram for forming an electrolyte for a battery.

FIG. 7 depicts a method for forming a resistance-stabilizing additive composition. At operation 200, a first resistance stabilizing additive is selected. At operation 210, the first resistance stabilizing additive is combined with a second resistance stabilizing additive to create a resistance stabilizing composition.

Figure 8:
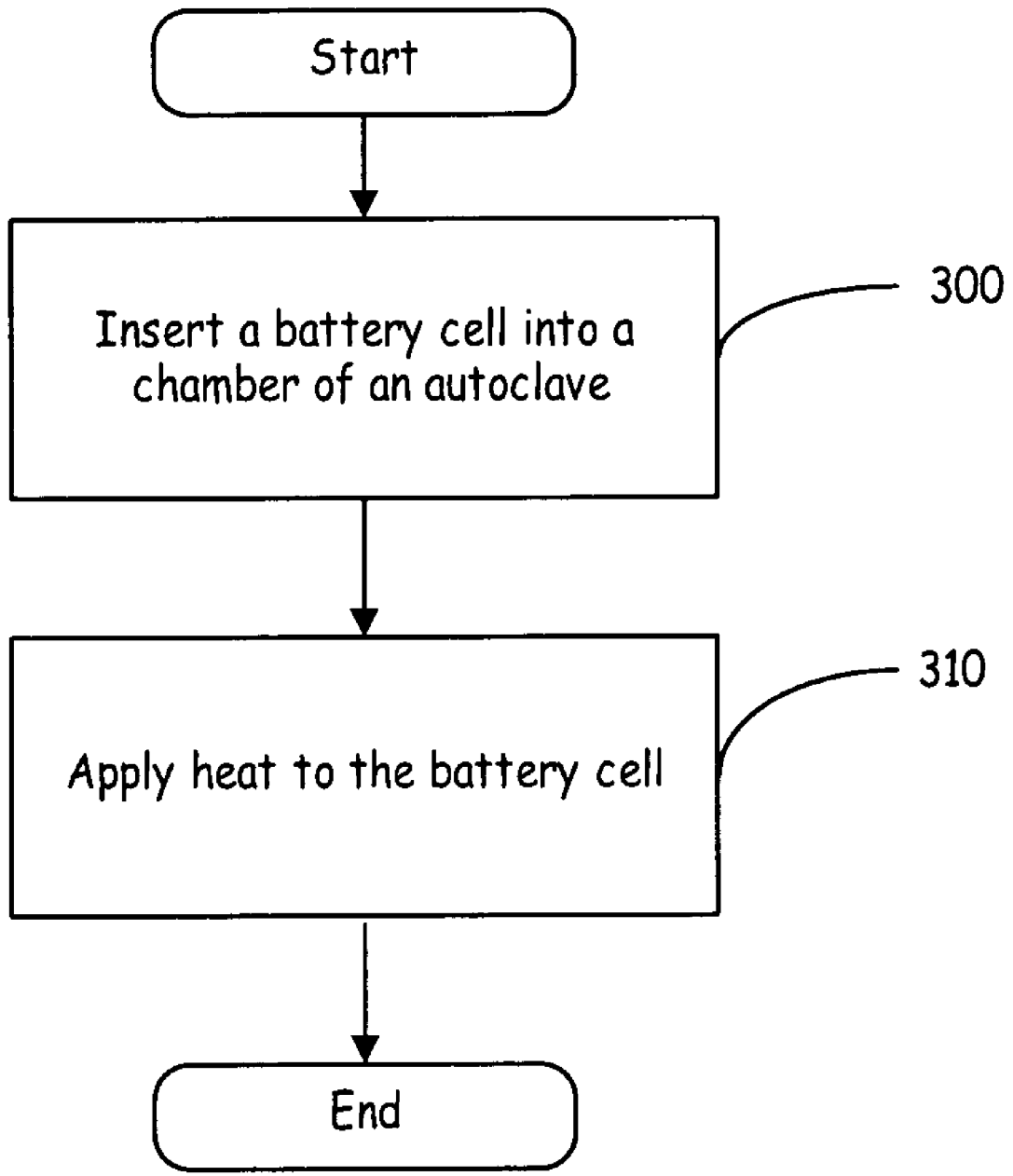
FIG. 8 is a flow diagram for autoclaving a battery.

FIG. 8 depicts a method for autoclaving battery cell 54. Battery cell 54 is inserted into a chamber of an autoclave at operation 300. Battery cell 54 includes an electrolyte and a first resistance-stabilizing additive combined with the electrolyte. At block 310, heat is applied to the chamber of the autoclave. Generally, the autoclaving process occurs at a temperature of 125° C. for a half an hour per cycle. The autoclave cycle is repeated at least three times. After three cycles of autoclaving, battery cell 54 adequately operates.

The following patent application is incorporated by reference in its entirety. Co-pending U.S. patent application Ser. No. 11/343,323 (U.S. Pat. App. Pub. No. 2007/0176151), entitled "ELECTROLYTE ADDITIVE FOR PERFORMANCE STABILITY OF BATTERIES", filed by Kevin Chen, Donald Merritt and Craig Schmidt on Jan. 31, 2006, and assigned to the same Assignee of the present invention, describes resistance-stabilizing additives for electrolyte.

Although various embodiments of the invention have been described and illustrated with reference to specific embodiments thereof, it is not intended that the invention be limited to such illustrative embodiments. For example, while an additive composition is described as a combination of two additives, it may also include two or more additives selected from Table 1. The description of the invention is merely exemplary in nature and, thus, variations that do not depart from the gist of the invention are intended to be within the scope of the invention. Such variations are not to be regarded as a departure from the spirit and scope of the invention.

The invention claimed is:

1. An electrolyte comprising a base liquid electrolyte composition and a resistance-stabilizing additive, wherein the resistance-stabilizing additive comprises a compound comprising an electron-withdrawing group that is selected from one of trifluoromethylvinyl acetate and 2,2,2-trifluoroacetamide.

2. An electrolyte comprising a base liquid electrolyte composition and a resistance-stabilizing additive, wherein the resistance-stabilizing additive comprises 2,2,2-trifluoroacetamide.

3. An electrolyte comprising:
a base liquid electrolyte composition;
a first resistance-stabilizing additive; and
a second resistance-stabilizing additive combined with the first resistance-stabilizing additive;
wherein the first resistance-stabilizing additive comprises 2,2,2-trifluoroacetamide.

4. The electrolyte of claim 3, wherein second resistance-stabilizing additive comprises at least one of TMA hydrogen phthalate, TBA hydrogen sulfate, phosphonoacetic acid, trifluoromethyl vinyl acetate, phthalic acid, benzoylacetone, benzoyltrifluoroacetone, and benzoic acid.

5. The electrolyte of claim 4, further comprising:
a third resistance-stabilizing additive, the third resistance-stabilizing additive being different from the first and second resistance-stabilizing additives and comprising at least one of TMA hydrogen phthalate, TBA hydrogen sulfate, phosphonoacetic acid, trifluoromethyl vinyl acetate, phthalic acid, benzoylacetone, benzoyltrifluoroacetone, and benzoic acid.

6. A method for forming an electrolyte in a battery cell for an implantable medical device, the method comprising:
selecting a first resistance-stabilizing additive;
combining a second resistance-stabilizing additive with the first resistance-stabilizing additive to form a resistance-stabilizing composition; and
combining the resistance-stabilizing composition with a base electrolyte composition for the battery cell;
wherein the first resistance-stabilizing additive comprises 2,2,2-trifluoroacetamide.

7. The method of claim 6, wherein the second resistance-stabilizing additive comprises at least one of TMA hydrogen phthalate, TBA hydrogen sulfate, phosphonoacetic acid, trifluoromethyl vinyl acetate, phthalic acid, benzoylacetone, benzoyltrifluoroacetone, and benzoic acid.

8. A battery comprising an electrode assembly and an electrolyte, wherein the electrolyte comprises a liquid electrolyte and a resistance-stabilizing additive, wherein the resistance-stabilizing additive comprises trifluoromethylvinyl acetate, 2,2,2-trifluoroacetamide, or combinations thereof.

9. The battery of claim 8, wherein the resistance-stabilizing additive comprises 2,2,2-trifluoroacetamide.

10. An implantable medical device comprising the battery of claim 9.

11. The battery of claim 8, wherein the resistance-stabilizing additive comprises trifluoromethyl vinyl acetate.

12. An implantable medical device comprising the battery of claim 11.

13. A battery comprising an electrode assembly and an electrolyte, wherein the electrolyte comprises a liquid electrolyte and a resistance-stabilizing additive composition, the additive composition comprising:
a first resistance-stabilizing additive; and
a second resistance-stabilizing additive combined with the first resistance-stabilizing additive;
wherein the first resistance-stabilizing additive comprises 2,2,2-trifluoroacetamide.

14. The battery of claim 13, wherein the second resistance-stabilizing additive comprises at least one of TMA hydrogen phthalate, TBA hydrogen sulfate, phosphonoacetic acid, trifluoromethyl vinyl acetate, phthalic acid, benzoylacetone, benzoyltrifluoroacetone, and benzoic acid.

15. An implantable medical device comprising the battery of claim 13.

16. An electrolyte comprising:
a base liquid electrolyte composition;
a first resistance-stabilizing additive; and
a second resistance-stabilizing additive combined with the first resistance-stabilizing additive;
wherein the first resistance-stabilizing additive comprises trifluoromethyl vinyl acetate.

17. The electrolyte of claim 16, wherein the second resistance-stabilizing additive comprises at least one of TMA hydrogen phthalate, TBA hydrogen sulfate, phosphonoacetic acid, 2,2,2-trifluoroacetamide, phthalic acid, benzoylacetone, benzoyltrifluoroacetone, and benzoic acid.

18. The electrolyte of claim 17, further comprising:
   a third resistance-stabilizing additive, the third resistance-stabilizing additive being different from the first and second resistance-stabilizing additives and comprising at least one of TMA hydrogen phthalate, TBA hydrogen sulfate, phosphonoacetic acid, 2,2,2-trifluoroacetamide, phthalic acid, benzoylacetone, benzoyltrifluoroacetone, and benzoic acid.

19. A method for forming an electrolyte in a battery cell for an implantable medical device, the method comprising:
   selecting a first resistance-stabilizing additive;
   combining a second resistance-stabilizing additive with the first resistance-stabilizing additive to form a resistance-stabilizing composition; and
   combining the resistance-stabilizing composition with a base electrolyte composition for the battery cell;
   wherein the first resistance-stabilizing additive comprises trifluoromethyl vinyl acetate.

20. The method of claim 19, wherein the second resistance-stabilizing additive comprises at least one of TMA hydrogen phthalate, TBA hydrogen sulfate, phosphonoacetic acid, 2,2,2-trifluoroacetamide, phthalic acid, benzoylacetone, benzoyltrifluoroacetone, and benzoic acid.

21. A battery comprising an electrode assembly and an electrolyte, wherein the electrolyte comprises a liquid electrolyte and a resistance-stabilizing additive composition, the additive composition comprising:
   a first resistance-stabilizing additive; and
   a second resistance-stabilizing additive combined with the first resistance-stabilizing additive;
   wherein the first resistance-stabilizing additive comprises trifluoromethyl vinyl acetate.

22. The battery of claim 21, wherein the second resistance-stabilizing additive comprises at least one of TMA hydrogen phthalate, TBA hydrogen sulfate, phosphonoacetic acid, 2,2,2-trifluoroacetamide, phthalic acid, benzoylacetone, benzoyltrifluoroacetone, and benzoic acid.

23. An implantable medical device comprising the battery of claim 21.

* * * * *